United States Patent

Milstein et al.

[11] Patent Number: 5,601,661
[45] Date of Patent: Feb. 11, 1997

[54] METHOD OF USE OF THERMOPHOTOVOLTAIC EMITTER MATERIALS

[76] Inventors: Joseph B. Milstein, 134 Foster St., Brighton, Mass. 02135; Ronald G. Roy, 15 Guile Ave., Tewksbury, Mass. 01876

[21] Appl. No.: 505,402

[22] Filed: Jul. 21, 1995

[51] Int. Cl.$^6$ ................................. H01L 31/058
[52] U.S. Cl. ................................. 136/253; 431/100
[58] Field of Search ..................... 136/253; 431/100

[56] References Cited

U.S. PATENT DOCUMENTS

| | | | |
|---|---|---|---|
| 4,764,104 | 8/1988 | Nelson | 431/100 |
| 4,776,895 | 10/1988 | Goldstein | 136/253 |
| 4,826,426 | 5/1989 | Nelson | 431/100 |
| 4,883,619 | 11/1989 | Diederich et al. | 264/60 |
| 5,018,963 | 5/1991 | Diederich | 431/1 |
| 5,240,407 | 8/1993 | Diederich et al. | 431/110 |
| 5,356,487 | 10/1994 | Goldstein et al. | 136/253 |
| 5,360,490 | 11/1994 | Nelson | 136/253 |
| 5,385,114 | 1/1995 | Milstein et al. | 117/1 |

OTHER PUBLICATIONS

J. B. Milstein et al, *AIP Conference Proceedings* 321, pp. 276–290 (1995).

*Primary Examiner*—Aaron Weisstuch

[57] ABSTRACT

The invention concerns the use of materials which exhibit photonic band gaps in the near infrared and visible regions of the optical spectrum as thermophotovoltaic emitter materials.

The materials used according to the invention are particularly suitable for use in the conversion of thermal or heat energy into optical or light energy. U.S. Pat. No. 5,385,114, PHOTONIC BAND GAP MATERIALS AND METHOD OF PREPARATION THEREOF, was issued on Jan. 31, 1995 to the present inventors for a class of material which can be employed according to the present invention.

According to the invention it is possible to employ these materials in the conversion of thermal energy to optical energy, in particular as a thermophotovoltaic emitter material, when the thermal energy is supplied by sources such as flames, sunlight or other broadband electromagnetic sources, or hot gases or fluids. By its nature, as disclosed in the earlier filings, the material emits optical or light energy in one or more narrow bands, which may be received by a sensor such as a photovoltaic cell that converts optical or light energy into electricity. In particular, certain significant benefits are obtained by use of the instant technology.

7 Claims, 1 Drawing Sheet

METHOD OF USE OF THERMOPHOTOVOLTAIC EMITTER MATERIALS

BACKGROUND OF THE INVENTION

1. Field of the Invention

The present invention relates to the use of materials which are reticulated solids, such as the photonic band gap (PBG) materials previously claimed in U.S. Pat. No. 5,385,114 (the disclosure of which is incorporated herein by reference, said patent hereinafter referred to as "'114"), as emitter materials in the conversion of thermal or heat energy into optical or light energy, in order to make possible further conversion of the energy from optical or light energy into electrical energy by objects such as well known photovoltaic cells in a more efficient manner than heretofore has been possible.

In particular, one use of these materials is the efficient conversion of thermal or heat energy supplied by flames, sunlight or other broadband electromagnetic sources, or hot gases or fluids into optical or light energy. The light which is produced may be controlled to occur in one or more narrow bands, which permit more efficient conversion from optical or light energy to electricity in photovoltaic cells.

2. Description of the Prior Art

A review of possible applications of PBG materials is presented by Henry O. Everitt in an article entitled, "Applications of Photonic Band Gap Structures", in Optics and Photonics News, volume 3, number 11, pages 20–23, which was published in November, 1992. He includes discussions of resonators, filters, and lasers. Another paper entitled, "Cavity Quantum Electrodynamics at Optical Frequencies", by Morin, et. al., in Optics and Photonics News, volume 3, number 8, pages 8–14, was published in August, 1992. This paper discusses cavities used in quantum physics, and mentions "Yablonovite", a theoretical photonic band gap material. Neither paper discusses the type of thermal to optical conversion contemplated here, which was first alluded to and described in the application which resulted in '114.

A rather old technology for converting thermal energy to optical energy is the Wellsbach mantle, which was patented before 1900. This concept finds application in Coleman lanterns, in which thermal energy from a propane/air flame is converted directly to light. Wellsbach recognized that very fine particles, such as filaments, are readily heated to incandescence, given their small mass. He recognized that materials having small cross sections and long lengths, such as filaments, would tend to be poor thermal conductors. This combination of properties, in a refractory material, yields a structure which produces light with moderately high efficiency from thermal sources. However, significant problems associated with such structures are their lack of ability to withstand mechanical stresses and thermal shocks. We have discovered a class of materials that overcome this difficulty.

At the First National Renewable Energy Laboratory Conference on Thermophotovoltaic Generation of Electricity, held Jul. 24–27, 1994 in Copper Mountain, Colo., there was general agreement that a major unattained technical requirement for efficient thermophotovoltaic systems is stable operation of an emitter at 1800° C. or higher. Most of the presentations at this meeting have been published in the proceedings of the First National Renewable Energy Laboratory Conference on Thermophotovoltaic Generation of Electricity, Copper Mountain, Colo., Jul. 25–27, 1994, published by the American Institute of physics as AIP Conference Proceedings 321 in December 1994. [TPV Conf. Proc.]

Four important reasons were cited for the use of such a high temperature emitter. These reasons are:
1. higher optical power density with higher temperature, leading to higher output power,
2. better matching of emission of radiation at higher temperature to wide bandgap photovoltaic detectors, such as silicon, amorphous silicon, or gallium arsenide, leading to higher power and greater efficiency,
3. smaller losses in electrical output due to bandgap narrowing when wide bandgap materials are used, leading to greater efficiency, and
4. lower resistive losses when higher voltage, lower current (e.g., wide bandgap) photovoltaic detectors are used, leading to higher power and greater efficiency.

It is also apparent that an emitter which selectively emits radiation at or near the wavelength at which the maximum absorption of a photovoltaic detector occurs will tend to increase the efficiency of the overall system, which is a desirable outcome.

We are aware that work on selective emitters that may operate at elevated temperatures is being carried out at NASA Lewis Research Center, Auburn University, and Tecogen. D. Chubb and coworkers at NASA Lewis Research Center are investigating the theory of such emitters, and are measuring optical behavior of systems employing such emitters made from sections of excess rare-earth doped YAG laser crystal rods. NASA Lewis Research Center investigators have told us that they have great difficulty obtaining such materials because of the expense involved, and have no way of having materials made to their express specifications with regard to rare-earth ion content. It is also well known that such laser crystals have marked tendency to crack when heated quickly. We have been informed by prof. Amnon Yogev of the Weitzmann Institute that attempts in his group to heat a ruby laser crystal with concentrated sunlight failed when the crystal cracked under the thermal shock and associated mechanical stresses. The fact that they possess melting points which are typically lower than 2000° C. further makes them incapable of use at 2000° C.

M. F. Rose and coworkers at Auburn University are making emitters using papermaking technology, which involves the preparation of solutions of the ions of interest, followed by the preparation of thin sheets of material which are then fired. From the description they have given at the NREL meeting, the final product includes considerable quantities of silicates and aluminates, as well as rare-earth ions. Such materials are also well known to melt at temperatures below 2000° C. Thin foils such as the paper-like materials being produced are not particularly durable or strong.

Dr. Robert E. Nelson of Tecogen is working in the area of thermophotovoltaic conversion. Nelson has observed the emission of heated lanthanide rare earth oxide fibers tends to occur in a narrow band. Tecogen makes their emitters by a process that involves taking up a solution of a rare-earth nitrate into a yarn, drying the yarn, firing the yarn to produce a filament of rare-earth oxide, and then weaving a structure in a ceramic support using the fiber in a process similar to the making of latch-hook rugs. According to Nelson, the structure that Tecogen has patented is subject to mechanical and thermal stress damage, as the fibers have diameters of micron dimensions, and are not useful at temperatures approaching 2000° C. for extended periods of time. Nelson's structure is not amenable to being heated by a source such as concentrated sunlight because it is composed of both an active material in filamentary form and a support structure of a non-active ceramic, both of which would be heated simultaneously by impinging solar radiation. The support ceramic is neither intended to nor capable of surviving the high temperatures that concentrated solar energy would create.

These prior inventions suffer from a number of limitations and disadvantages which the present invention overcomes. These limitations and disadvantages include low temperature of operation, operation using limited or restricted sources of power, limitations regarding the thermal and mechanical stresses that can be supported, and limitations with regard to emissive power. Our invention provides a solution to each of these problems.

In contradistinction to the materials employed by others, we have discovered how to employ our materials in a manner such that they exhibit very high temperature operation at 2000° C., they can be operated with several different power sources, they exhibit great resistance to both thermal shock and mechanical stress, and they provide very large emissive powers.

In addition, we have discovered other new details of use, which, when taken together, permit our invention to achieve results which the previously disclosed technologies are not capable of achieving. These discoveries will be stated explicitly in the discussion of the invention.

Many embodiments of the present invention can be envisioned. In one instance, the material can be made to operate using flames created by burning hydrocarbon gases such as propane or natural gas in air. In another instance, concentrated sunlight, up to 2000 times as intense as natural sunlight, may be used as a power source. In yet another instance, hot fluid may be used as a power source.

In addition, thermophotovoltaic emitter materials used according to the prescriptions given in the present invention may be used in optical equipment and machines of more advanced design than those manufactured previously.

We will present an example which demonstrates the superiority of the present invention over the prior art in emitter materials for use in thermophotovoltaic applications.

SUMMARY OF THE INVENTION

A specific example which we have investigated is the use of materials produced in accordance with the teachings of '114, whereby we have produced reticulated ceramic oxide materials in the system $Yb_2O_3$—$Al_2O_3$ and have performed investigations of their use and properties as thermal to optical energy conversion media.

We have discovered what we can successfully attain both selective emitter behavior and high temperature operation simultaneously. This range of compositions includes three well known laser host phases, including pure $Al_2O_3$, the 37.5% $RE_2O_3$–62.5% $Al_2O_3$ (or $RE_3Al_5O_{12}$, where RE represents rare earth) garnet, and the 50% $RE_2O_3$ —50% $Al_2O_3$ (or $REAlO_3$) rare earth aluminate phase.

We believe that this is a very significant first demonstration that specific desired phases can be generated which have the desired composition, desired pore size, desired porosity, reasonable mechanical strength, and desired optical behavior.

These materials have continuous pores of a preselected narrow range throughout their volume. We have demonstrated the ability to produce material having porosity in the range that is desired, approximately 70 to 80 percent. As measured by scanning electron microscopy, pores of approximately 10 micrometers, 34 micrometers, 100 micrometers, and 200 micrometers in diameter have been produced in a controlled manner. Starting compositions from pure aluminum oxide to 90% ytterbium oxide—10% aluminum oxide have been employed. The resulting materials include pure alumina, aluminum ytterbium garnet, and ytterbia, as determined from x-ray diffraction examination. These specimens have good resistance to thermal shock, are durable, and are mechanically and chemically stable. The integrated emission of light generated by these unoptimized specimens when heated with a propane-air flame and detected with a silicon photodetector ranged up to 1.88 watts/cm$^2$, which corresponds to twice the energy that a solar cell of this type would receive from conventional sunlight. The emission spectrum from these specimens when heated with a propane-air flame and detected with a germanium photodetector and a series of narrow passband optical filters shows a narrow band in the vicinity of 1 micron. The emission spectrum from these specimens when heated with a propane-air flame and detected with a spectroradiometer shows a narrow band in the vicinity of 1 micron with a very low background emission at both longer and shorter wavelengths in the range of 0.3 microns to 2.5 microns.

Measurements conducted on a number of our unoptimized selective emitter materials based on $Yb_2O_3$ have demonstrated that the material is extremely stable, is resistant to thermal shock and mechanical stress, and emits significant quantities of light which can be detected by silicon photovoltaic devices. We have specifically tested several samples for thermal shock resistance, and all survived without damage or apparent degradation. These tests included heating with propane-air flames, heating with a hand-held propane torch, and heating in a radio frequency furnace to approximately 1500° C. followed by quenching. We have tested our materials under solar concentration of approximately 2000 suns in a solar furnace. Some of our materials have been tested at temperatures in excess of 2000° C. for extended periods of time. These materials suffered little or no degradation when the concentrated sunlight (190 watts per centimeter squared, or approximately 2000 times concentration) was repeatedly turned on in one-half second or turned off in one-half second, subjecting the samples to severe thermal shock. A total hemispherical irradiance of approximately 500 watts was measured from a specimen of 1.5 centimeters in diameter by 2 centimeters tall which was illuminated with concentrated sunlight on one end. Under the same conditions, a light flux of 8 watts per square centimeter at a distance of one meter has been recorded. These temperatures of operation, resistance to thermal shock, and values of emitted light are markedly superior to those demonstrated by others.

We have demonstrated that we can make specimens of material that have good mechanical stability. The samples we have produced with the larger pore sizes are in fact readily machinable. This property is important in terms of designing optical components. Since the material is machinable, we can readily and economically construct the shapes needed by end users.

We have demonstrated that the material based on $Yb_2O_3$ we have produced converts thermal energy to optical energy which appears in a narrow emission band in the vicinity of 1 micron. This is quite close to the wavelength used by prof. Martin A. Green (1.06 microns generated by a Nd:YAG laser) to demonstrate 45% efficiency in silicon solar cells. The significance of our result is that we have the potential to produce an emitter which will be highly efficient in converting thermal energy to light of a type which is readily and efficiently converted to electrical energy in a readily available silicon photodetector.

We can prepare materials by the process taught in '114 using other rare earth element oxides, such as erbium oxide, holmium oxide, or terbium oxide, and provide specimens whose emissive properties are tuned to tie optimized for use with photodetectors other than silicon. We have, for example, used germanium photodetectors in our earlier work with regard to determining the spectral characteristics of the emission from our ytterbium oxide based materials.

Our optical measurement results indicate that chemical composition, pore size, porosity and surface texture all have effects on the efficiency of emission of our material.

We reported in our 1994 paper that surface texturing can have a very significant effect on the integrated emission of the material, especially as the pore size of the material, and the associated dimension of the solid material, is reduced. The ability to modify or to texture the surface of an emitter such as ours can therefore have an appreciable influence on the utility of the emitter. There are two ways to introduce texture into the materials that we can fabricate.

The first approach is mechanical shaping of the material after growth. This requires that we produce material that can withstand the mechanical forces required to selectively remove material.

The second is by shaping the template body from which the material is to be made prior to fabrication of the body. We have observed that the fabricated material conforms closely to the original shape of the template in which it is fabricated. It is therefore possible to perform the mechanical shaping operations when the template is produced, and to obtain a shaped reticulated emitter, including surface texture, directly.

There are many methods of heating emitters in TPV devices. One relies on the combustion of chemical fuels, such as hydrocarbon/air flames. Another uses heat in the form of optical radiation, in particular concentrated solar energy. Another uses the thermal energy in exhaust gases or liquids from thermal processes which are conducted for other purposes. In all such cases, it is possible to attain elevated temperatures. These sources are complementary, in that fuel may be employed at times when solar energy is not available. We have produced emitters which can be employed with many energy sources.

In the present invention, the use of a material which operates as a high temperature, thermally, mechanically and chemically stable, thermal to optical energy emitter has been discovered. None of the difficulties presented in the literature regarding the use of the material are impediments to its use by the method and means we have discovered. A significant improvement in the ease of use, relaxation of the conditions and means of employment, and improved efficiency and power density has resulted.

The general purpose of this invention is to provide a method and means for the use of a material as a thermal to optical energy emitter, such as a thermophotovoltaic emitter, which has all of the advantages of similarly employed technology and has none of the above described disadvantages. To attain this, the present invention provides a unique method and means of use.

An object of the instant invention is to provide method and means of use of a high temperature, air stable, thermally and chemically stable, shock resistant, high emissivity thermophotovoltaic emitter material which has all of the advantages of similarly employed technology and has none of the above described disadvantages. To attain this, the present invention provides a unique method and means of using a thermophotovoltaic emitter material.

Another object of the instant invention is to provide method and means of use of a high temperature, air stable, thermally and chemically stable, shock resistant, high emissivity thermophotovoltaic emitter material which has all of the advantages of similarly employed technology and has none of the above described disadvantages. To attain this, the present invention provides a unique method and means of using a thermophotovoltaic emitter material with gas flames as a power source.

Yet another object of the instant invention is to provide method and means of use of a high temperature, air stable, thermally and chemically stable, shock resistant, high emissivity thermophotovoltaic emitter material which has all of the advantages of similarly employed technology and has none of the above described disadvantages. To attain this, the present invention provides a unique method and means of using a thermophotovoltaic emitter material with concentrated sunlight as a power source.

These and other objects and features of the present invention will be apparent to those skilled in the art from the following descriptions of specific embodiments of the invention taken in conjunction with the figures.

BRIEF DESCRIPTION OF THE DRAWINGS

Other objects and many of the attendant advantages of this invention will be readily appreciated as the same becomes better understood by reference to the following detailed description when considered in connection with the accompanying drawing, in which like reference numerals designate like parts throughout the figures thereof and wherein.

DETAILED DESCRIPTION OF THE PREFERRED EMBODIMENTS

Figure 1:
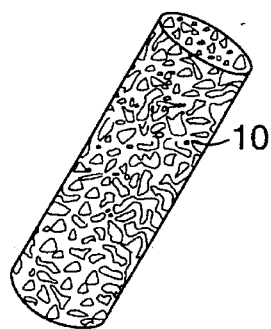
FIG. 1 is a perspective view of the reticulated thermophotovoltaic emitter material which may be used in a manner embodying the present invention.

Referring to FIG. 1, the thermophotovoltaic emitter material is comprised of a reticulated solid 10 which forms a cylinder. In FIG. 1, the solid portion of the material is shown in black, and the voids in the material, which extend substantially and continuously throughout the body of the material, are shown in white. The material may be a material of the type taught in '114. It may be composed of high melting substances chosen from the group comprising aluminum oxide or sapphire, other oxides such as ruby (chromium-doped aluminum oxide), yttrium aluminum garnet (YAG) or other similar synthetic garnets, rare earth oxides, magnesium oxide, calcium oxide, strontium oxide, barium oxide, yttrium oxide, zirconium oxide, and mixtures or compounds of these oxides. The solid is shown as a cylinder simply because this geometry is a convenient one for use in a conventional optical system involving the propagation of collimated light beams, or the conveyance of a gas. As will become apparent from the description of the use of the solid, other geometrical forms can readily be employed in similar fashion to that described for the material presented in FIG. 1.

The thermophotovoltaic emitter material may be employed as follows. In the most general case, thermal or heat energy is applied to the material, and the material responds by emitting light in one or more band or regions of the infrared or visible spectrum. The region in which the light is emitted may be controlled both by means of the chemical composition of the material and by the physical structure of the material, as taught in '114.

Figure 2:
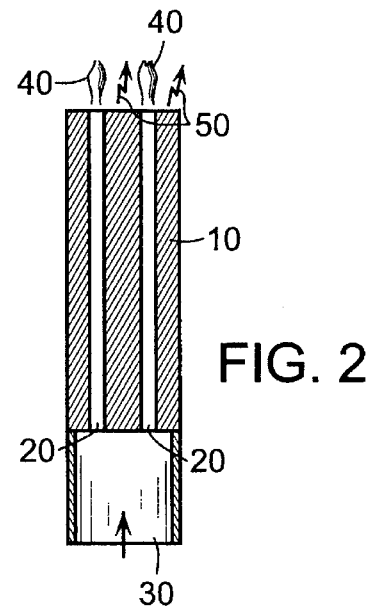
FIG. 2 is a cutaway sectional view taken through the material wherein combustible gas mixed with an oxidizing gas is conveyed through the pores or other deliberately prepared passages in the material, with combustion taking place at or near a surface of the material with thermal heating of the material and the emission of light.

In one preferred embodiment, shown in FIG. 2, the thermophotovoltaic emitter material 10 is provided with a mixture of combustible gas which may be propane mixed with an oxidizing gas which may be air through tube 30 from a source not shown. The gas mixture flows in the direction of the arrow via either the reticulations in the material or via deliberately produced passages 20 which may be tubulations produced for example by drilling the material with a boring drill of suitable diameter and length. The gas mixture is combusted at the surface of the material by providing a source of ignition (not shown) which may be a conventional lighter to institute combustion, resulting in flames 40 which thermally heat the material. Emitted light 50 is radiated from the heated emitter material. The emitted light which is radiated is composed of one or more intense narrow bands of radiation, and a much lower intensity of background radiation.

Figure 3:
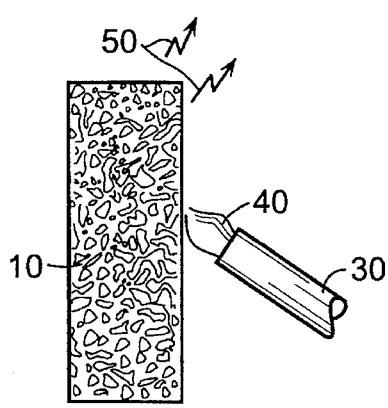
FIG. 3 is a cutaway sectional view taken through the material wherein combustible gas mixed with an oxidizing gas is conveyed from an external source to the surface of the material, with combustion taking place at or near a surface of the material with thermal heating of the material and the emission of light.

In another preferred embodiment, shown in FIG. 3, the thermophotovoltaic emitter material 10 is heated externally on some portion of its surface with the flame produced by the combustion of a mixture of combustible gas which may be propane mixed with an oxidizing gas which may be air through tube 30 from a source not shown. The gas mixture is combusted at the surface of the material by providing a source of ignition not shown which may be a conventional lighter to institute combustion, resulting in flames 40 which thermally heat the material. Emitted light 50 is radiated from the heated emitter material. The emitted light which is radiated is composed of one or more intense narrow bands of radiation, and a much lower intensity of background radiation. Instead of using the flame, one can envision substituting a hot fluid, such as heated air, heated gas, or heated liquid so as to supply the energy that the flame is employed to provide.

Figure 4:
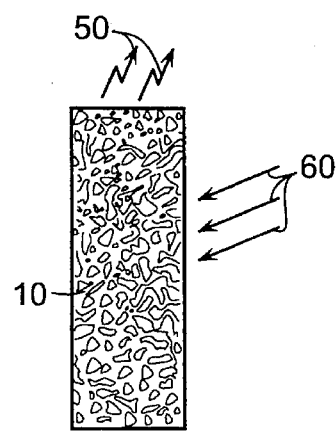
FIG. 4 is a cutaway sectional view taken through the material wherein concentrated sunlight is caused to impinge on the surface of the material, with thermal heating of the material and the emission of light.

In another preferred embodiment, shown in FIG. 4, the thermophotovoltaic emitter material 10 is heated with energy applied to it in the form of broadband electromagnetic radiation, which may be concentrated sunlight 60 produced by a solar concentrator not shown employing natural sunlight as input power, which thermally heats the material. Emitted light 50 is radiated from the heated emitter material. The emitted light which is radiated is composed of one or more intense narrow bands of radiation, and a much lower intensity of background radiation. Other forms of broadband electromagnetic energy, such as other light sources, may be used.

Yet other possible means of providing broadband thermal energy are known, such as the impingement of charged particles as in electron bombardment. Any of these well known means can be used to heat materials under selected conditions. While we have not had occasion to employ every possible means of providing broadband thermal energy that is described in the technical literature, we have used more means of applying such energy than have those who have described the prior art.

As indicated above, we have heated our material with gas flames both internally conveyed to the surface and externally applied, with concentrated sunlight, and with electromagnetic radiation in a radio frequency furnace using the intermediation of a metallic surface such as tungsten. The material has demonstrated emission in a narrow intense region when heated with broadband thermal or electromagnetic energy. The material has demonstrated that it can be employed under very high thermal stresses. The material has demonstrated that it is stable in air at very elevated temperatures. It is clear to us that the material could also be employed under the serial application of two or more of these means of heating, for example, to make use of available solar energy during the day, and to operate under gas flame excitation when sunlight is not available. It is further clear to us that the material could also be employed under the simultaneous application of two or more of these means of heating, for example, to make use of available solar energy during the day, and to operate under gas flame excitation when sunlight is temporarily reduced in intensity, such as by the passage of clouds, so as to maintain the output of the emitter at a constant and prescribed level.

The emitters taught in the prior art are all subject to destruction by application of thermal and mechanical stress, are not amenable to use by application of thermal energy from more than one source, are frequently limited in the geometries and shapes that can be produced and employed, are frequently limited in the temperatures of operation that they can attain, and do not offer any means of tuning their emission bands by means of their physical or mechanical design, but by their chemical composition alone. The present invention overcomes all of these limitations, and provides an emitter which may be used in high mechanical and thermal stress environments, which is amenable to use by application of several different sources, which can be produced in many geometries and shapes and can be machined if required, which can be operated at very high temperatures, which exhibits good chemical stability, and which employs the means of tuning of the emitted radiation by application of the teachings of '114.

Obviously many modifications and variations of the present invention are possible in light of the above teachings. The method of use of the thermophotovoltaic emitter material described herein provides a method of use which permits use under a variety of excitations, including those that present thermal and mechanical stresses to the emitter, and which provide operation under high temperatures. Other techniques for applying the present invention may be employed and changes made in regard to some of the details and still provide a method for the use of a thermophotovoltaic emitter material without deviating from the spirit and scope of the invention specified herein.

What is claimed is:

1. The method of using as a thermophotovoltaic emitter material a reticulated solid material comprising one or more periodic reticulated mesh physical structures which have a periodic retriculated with pore size in the range of 0.1 micron to 500 microns; and wherein said material is fabricated from one or more substances selected from the group consisting of:

a. polycrystalline aluminum oxide and single crystalline aluminum oxide;
b. oxides, including chromium-doped aluminum oxide, titanium-doped aluminum oxide, yttrium aluminum garnet, synthetic garnets, perovskites, and spinels;
c. elemental silicon and elemental germanium;
d. III-V compounds, including gallium arsenide, indium phosphide, and gallium aluminum arsenide;
e. II-VI compounds, including zinc selenide, zinc sulphide, cadmium telluride, mercury telluride, and mercury cadmium telluride;
f. rare-earth doped oxide glasses; and
g. materials, including epoxies and plastics, which have a high dielectric constant and can be infiltrated into a porous body and then solidified;

in which broadband thermal or heat energy is applied to the material and one or more narrow intense emission bands are produced and directed to at least one photovoltaic cell for absorption therein and conversion to electrical energy.

2. The method of use as in claim 1 wherein the broadband thermal or heat energy applied to the material is a combustion flame produced by providing combustible gas and oxidizing gas through the material with combustion at one or more surfaces of the material.

3. The method of use as in claim 1 wherein the broadband thermal or heat energy applied to the material is a combustion flame produced by providing combustible gas and oxidizing gas externally to the material with combustion at one or more surfaces of the material.

4. The method of use as in claim 1 wherein the broadband thermal or heat energy applied to the material is concentrated sunlight applied to one or more surfaces of the material.

5. The method of use as in claim 1 wherein the broadband thermal or heat energy applied to the material is electromagnetic energy applied to one or more surfaces of the material.

6. The method of use as in claim 1 wherein the broadband thermal or heat energy applied to the material is provided by hot fluid applied to one or more surfaces of the material.

7. The method of use as in claim 1 wherein the broadband thermal or heat energy applied to the material is a combination of two or more of the forms of energy selected from the group consisting of combustion flame energy, concentrated sunlight energy, electromagnetic energy, and energy from hot fluid applied simultaneously or consecutively to one or more surfaces of the material.

* * * * *